US010758909B2

(12) United States Patent
Hedglin (10) Patent No.: US 10,758,909 B2
(45) Date of Patent: Sep. 1, 2020

(54) DEVICE TO ASSIST IN MANUAL TRANSFER OF PIPETTE TIPS

(71) Applicant: Thomas A. Hedglin, Jackson, MS (US)

(72) Inventor: Thomas A. Hedglin, Jackson, MS (US)

(*) Notice: Subject to any disclaimer, the term of this patent is extended or adjusted under 35 U.S.C. 154(b) by 218 days.

(21) Appl. No.: 16/044,769

(22) Filed: Jul. 25, 2018

(65) Prior Publication Data

US 2019/0030542 A1 Jan. 31, 2019

Related U.S. Application Data

(60) Provisional application No. 62/536,551, filed on Jul. 25, 2017.

(51) Int. Cl.
*B01L 9/00* (2006.01)
*B01L 3/02* (2006.01)
*G01N 35/10* (2006.01)

(52) U.S. Cl.
CPC .......... *B01L 9/543* (2013.01); *B01L 3/0275* (2013.01); *G01N 35/1065* (2013.01); *B01L 3/021* (2013.01); *B01L 2200/025* (2013.01); *B01L 2200/087* (2013.01); *B01L 2200/18* (2013.01)

(58) Field of Classification Search
CPC ...... B01L 3/0279; B01L 3/0275; B01L 9/543; G01N 35/1065
See application file for complete search history.

(56) References Cited

U.S. PATENT DOCUMENTS

| 4,478,094 | A | * | 10/1984 | Salomaa | G01N 1/38 73/863.32 |
| 4,779,467 | A | * | 10/1988 | Rainin | B01L 3/0279 422/513 |
| 5,061,449 | A | * | 10/1991 | Torti | B01L 3/0217 422/525 |
| 5,915,284 | A | * | 6/1999 | Meltzer | B01L 3/0279 73/864.17 |
| 6,116,099 | A | * | 9/2000 | Carl | B01L 9/543 73/863.32 |
| 6,589,483 | B1 | * | 7/2003 | Maeda | B01L 3/0217 222/249 |
| 6,982,063 | B2 | * | 1/2006 | Hamel | G01N 35/028 422/511 |

(Continued)

*Primary Examiner* — Brian R Gordon
(74) *Attorney, Agent, or Firm* — Nixon & Vanderhye P.C.

(57) ABSTRACT

Pipette tip transfer devices allow for the pick-up of pipette tips from one location and the transfer the pipette tips to another location where the tips can then be released. The pipette transfer device includes a strip plate having a linear array of apertures positioned at a lower end of a frame. An actuator bracket is positioned within and mounted to the frame for reciprocal movements between lowered and raised positions, the actuator bracket carrying a linear array of pick-up pins dependently extending therefrom with each pin being received within a respective aperture of the strip plate. An actuator lock is mounted to the frame for manual manipulations between a locked position wherein movement of the actuator bracket is prevented when in the lowered position to allow frictional engagement between and pick-up of the pipette tips by the pins, and a released position whereby movement of the actuator bracket into the raised position thereof is allowed to thereby strip the frictionally engaged pipette tips from the pins.

10 Claims, 7 Drawing Sheets

(56) References Cited

U.S. PATENT DOCUMENTS

| | | | | |
|---|---|---|---|---|
| 7,189,369 B2 * | 3/2007 | Higuchi | ............... | B01L 3/0279 422/511 |
| 2001/0039843 A1 * | 11/2001 | Schoeppe | ............. | B01L 3/0279 73/863.32 |
| 2002/0053245 A1 * | 5/2002 | Carl | ..................... | B01L 3/0279 73/864.14 |
| 2002/0176801 A1 * | 11/2002 | Giebeler | ............. | G01N 21/253 422/82.05 |
| 2003/0017604 A1 * | 1/2003 | Hitch | ................ | G01N 35/1065 436/43 |
| 2003/0190263 A1 * | 10/2003 | Yiu | .................... | G01N 35/1074 422/525 |
| 2004/0033554 A1 * | 2/2004 | Powers | ............. | G01N 35/1083 435/29 |
| 2013/0068041 A1 * | 3/2013 | Naumann | ............. | B01L 3/0217 73/864.01 |
| 2014/0112839 A1 * | 4/2014 | Richardson | ........ | G01N 35/1065 422/511 |
| 2014/0363355 A1 * | 12/2014 | Bolliger | ............... | B01L 3/0279 422/526 |

* cited by examiner

DEVICE TO ASSIST IN MANUAL TRANSFER OF PIPETTE TIPS

CROSS-REFERENCE TO RELATED APPLICATION

This application is based on and claims domestic priority benefits from U.S. Provisional Application Ser. No. 62/536,551 filed on Jul. 25, 2017, the entire contents of which are expressly incorporated hereinto by reference.

FIELD

The embodiments disclosed herein relate generally to devices which assist in the transfer of multiple pipette tips.

BACKGROUND AND SUMMARY

Pipetting apparatus are conventionally employed in biochemical, pharmaceutical and clinical testing facilities so as to transfer small volumes of reagents and samples for various types of testing and assay procedures. Pipette tips are typically furnished in a rectilinear arrayed rack. Individual tips may therefore be picked up and removed from the rack to be used by the laboratory clinician as may be needed. It is sometimes necessary for multiple pipette tips to be picked up simultaneously from the rack and transferred to a different location for use.

The embodiments described herein therefore may usefully be employed to allow clinicians to manually pick up a linear array of multiple pipette tips for transport to a different location whereby the tips may then be released into a different rack for further use and/or analysis.

In general, therefore, the embodiments disclosed herein relate to pipette tip transfer devices having the ability to pick up pipette tips from one location and transfer the pipette tips to another location where the tips can then be released. In preferred embodiments, the pipette transfer device will include a frame, a strip plate positioned at a lower end of the frame having a linear array of apertures, an actuator bracket positioned within and mounted to the frame for reciprocal movements between lowered and raised positions, a linear array of pick-up pins dependently extending from the actuator bracket such that respective pins are moveably received with respective apertures of the strip plate; and an actuator lock mounted to the frame for manual manipulations between a locked and released positions. When in the locked position, the actuator lock is engaged with the actuator bracket to lock the actuator bracket in the lowered position, while in the released position thereof, the actuator lock is disengaged with the actuator bracket to allow the actuator bracket to move between the lowered and raised positions. Movement of the actuator bracket from the lowered position to the raised position therefore allows upper ends of pipette tips frictionally captured by the terminal ends of the pick-up pins to engage the strip bar and thereby be released from the pins.

The frame may have a generally inverted U-shaped configuration having a top handle member and an opposed pair of parallel side members dependently extending from the top handle member. According to some embodiments, the strip plate may be rigidly connected between the opposed pair of parallel side members of the frame.

The actuator bracket will preferably define an opening sufficient to allow fingers of a user to be inserted therein. For example, according to certain embodiments, the actuator bracket may include upper and lower bracket bars and opposed side bars that are interconnected to one another to define the opening.

Mounting pins may be provided to attach the actuator bracket to the frame to allow for reciprocal rectilinear movements between the lowered and raised positions thereof. At least one compression spring may be associated with the mounting pins to apply a spring force against the actuator bracket in a direction moving the actuator bracket into the lowered position thereof.

The actuator lock may be connected to one of the mounting pins to allow for pivotal and/or lateral movement between the locked and released positions thereof. According to certain embodiments, the actuator lock may comprise a base plate pivotally attached to the mounting pin, a spacer plate dependently extending from the base plate, and an inwardly turned stop member, the stop member being engaged with the actuator bracket when the actuator lock is in the locked position thereof, and being disengaged from the actuator bracket when the actuator lock is in the released position thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

As shown in FIGS. 1-7, the device 10 in accordance with an embodiment of the invention is comprised of a generally inverted U-shaped frame 12 having a top handle member 12a and opposed parallel side members 12b dependently extended therefrom. A strip plate 14 rigidly spans the distance between the opposed side members 12b and includes a linear array of apertures (a representative few of which are identified by reference numeral 16) to allow for rectilinear reciprocal movement thereof a pick-up pins 18 (a representative few of which are identified by reference numeral 18). The terminal ends of the pick-up pins 18 may be tapered slightly to allow entry into a respective one of the pipette tips PT positioned in a rack R.

A rectangular actuator bracket 20 comprised of upper and lower bracket bars 20a, 20b and opposed side bars 20c is moveably mounted to the upper handle member 12a by mounting pins 22a, 22b each provided with a respective compression spring 24a, 24b (see e.g., FIGS. 2-5). The bracket bars 20a, 20b and 20c are separated from one another to define a space 25 of sufficient size to allow the fingers of a user to be inserted during use. Thus, the actuator bracket 20 is capable of being rectilinearly moved within the frame 12 against the spring force of the springs 14a, 14b between a lower position whereby the terminal ends of the pins 16 may be inserted into and frictionally engaged with the upper tubular portion of a respective pipette tip PT and a raised position whereby the pipette tips PT are forcibly pushed off the terminal ends of the pins 16 by engagement with the strip plate 14.

An actuator lock 26 is operatively provided with one of the mounting pins 22 so as to be capable of manual manipulations (e.g., by a user's thumb when grasping the device 10) during use. Specifically, the actuator lock 26 is provided with a base plate 26a which is mounted to the pin 22 for pivotal movements about the pin axis. A spacer plate 26b is dependently fixed to the base plate 26a and includes an inwardly turned stop member 26c at a lower end thereof. The actuator lock 26 is generally pivotal about the axis of mounting pin 22a so as to be moveable between a locked position whereby a portion of the stop member 26c engages with the top surface of the upper bracket bar 20a to prevent the actuator bracket 20 from being moved upwardly from its lowered pick-up position, and a release position which moves the stop member 26c out of engagement with the upper bracket bar 20a so as that the bracket bar 20a is released to move upwardly against the spring force of the springs 14a, 14b and into its upward release position. If desired, some lateral movement or slight lateral play may be provided between the pin 22a and the base plate 26a so that the latter may be positioned below the bar 20a to lock the actuator bracket in the raised position.

Figure 1:
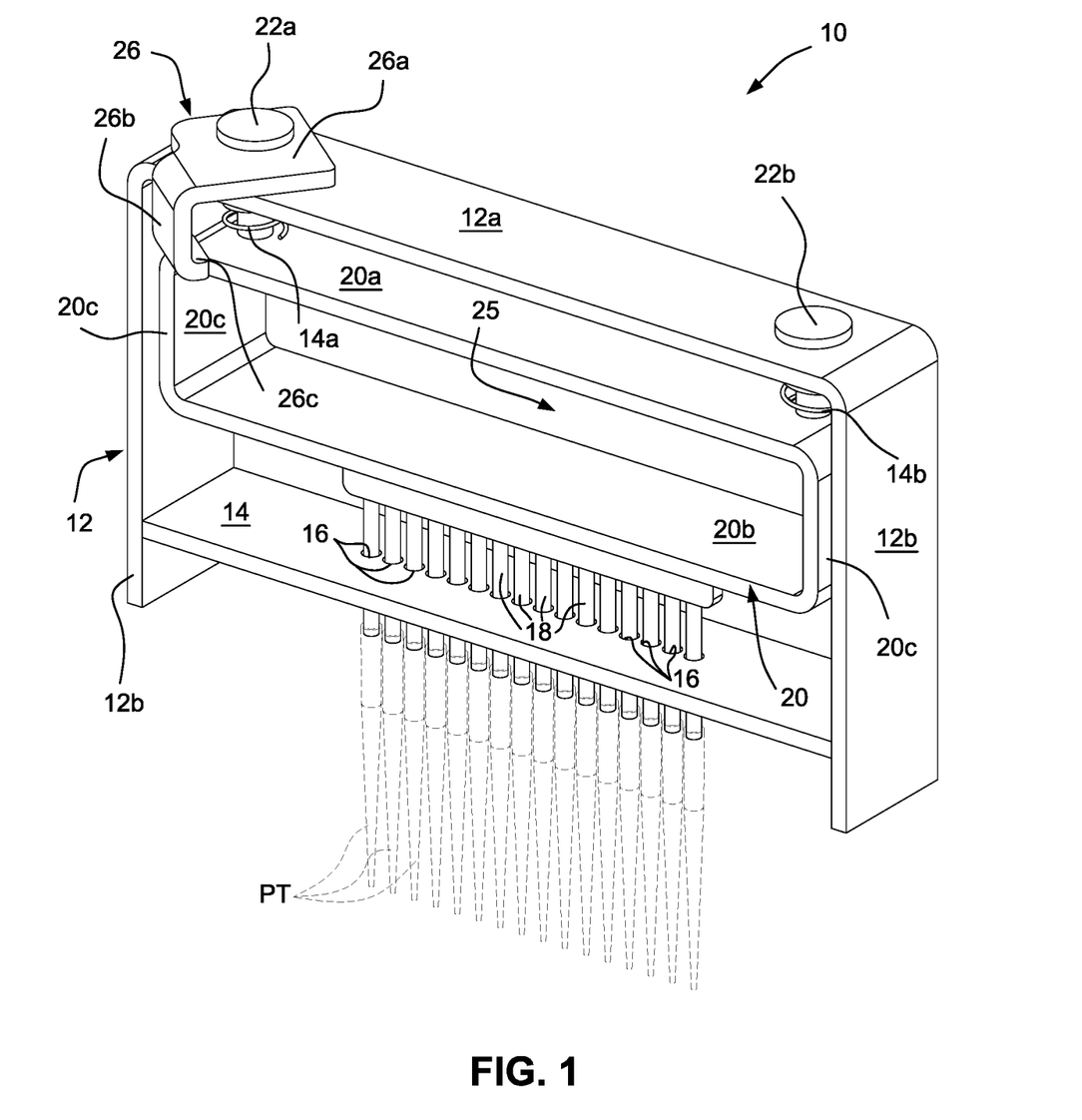
FIG. 1 is a perspective view of a device in accordance with an embodiment of the invention.
Figure 2:
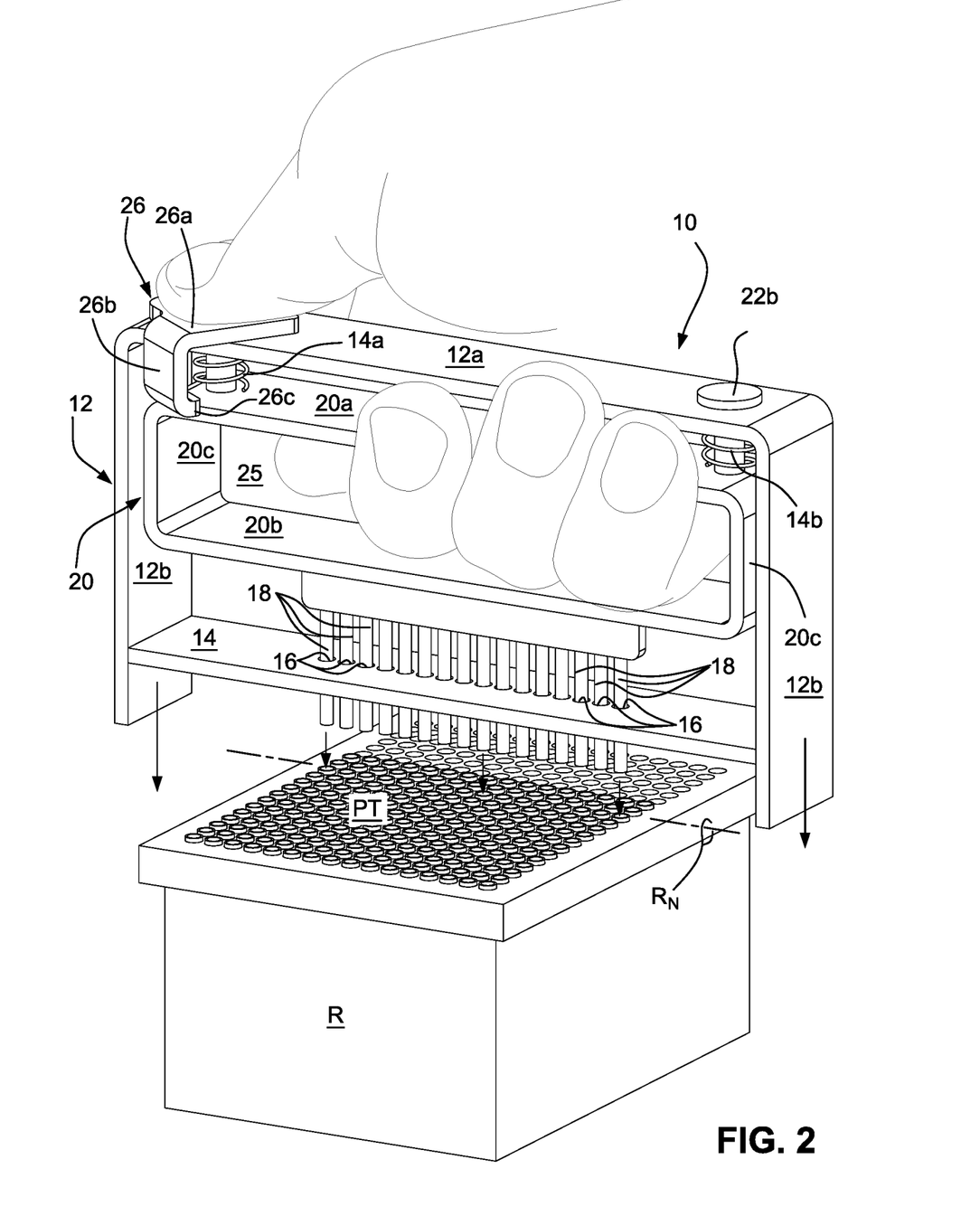
FIGS. 2-7 are perspective views showing a sequence by which pipette tips may be manually picked up and released by the device shown in FIG. 1.
Figure 3:
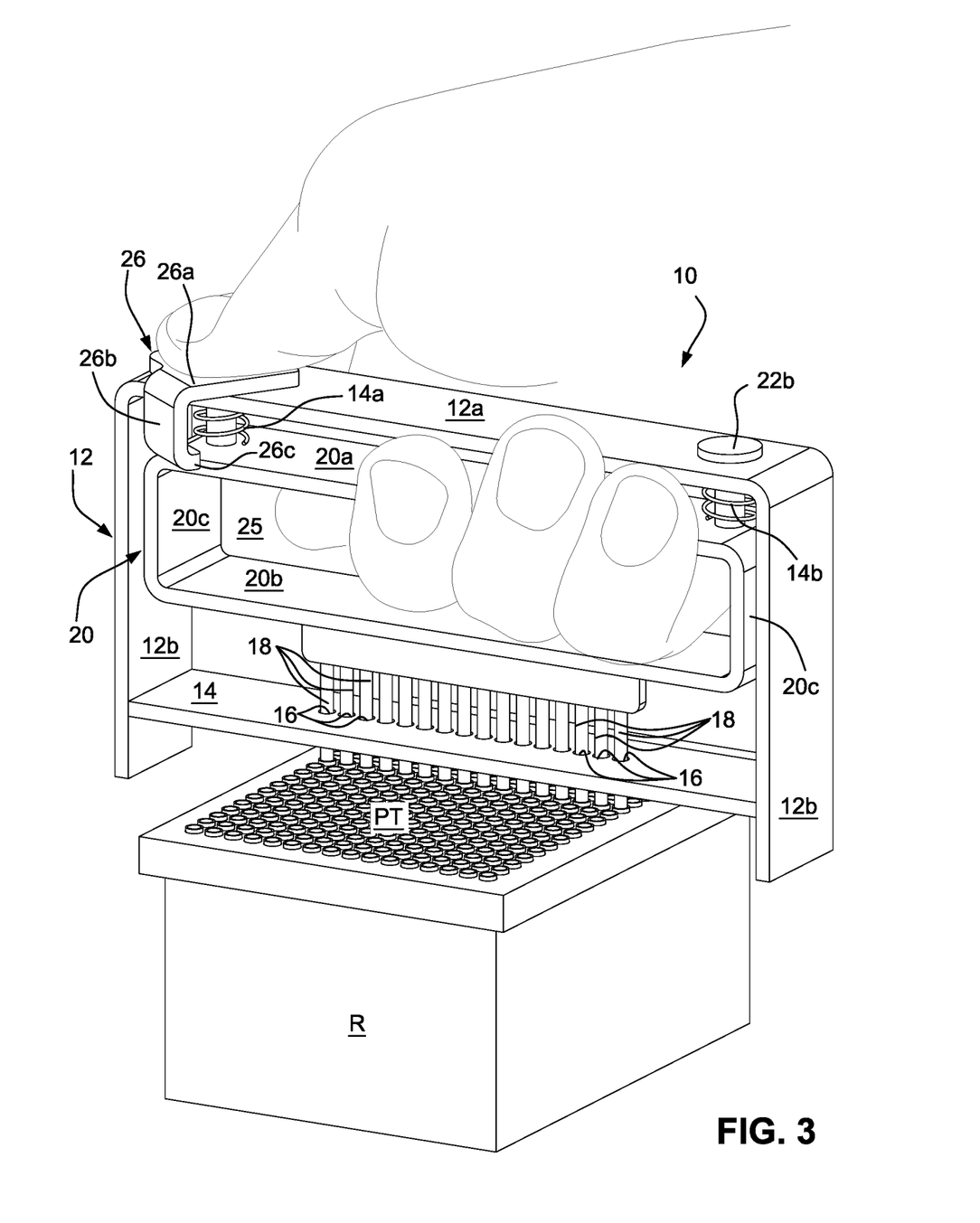

In use, the device 10 may initially be positioned over a linear array of pipette tips PT positioned in a row RN within the rack R as shown in FIG. 2 so that the each of the pick-up pins 18 is aligned with an open end of a respective pipette tip PT in such row RN. In this state, the actuator lock 26 is positions so that stop member 26c is engaged with the top surface of the upper bracket bar 20a so as to prevent the actuator bracket 20 from being moved upwardly within the frame 12. While in such a state, the device 10 may be pushed downwardly as shown in FIG. 3 so the terminal end portion of each pin 18 is frictionally seated within an upper tubular region of a respective pipette tip PT.

Figure 4:
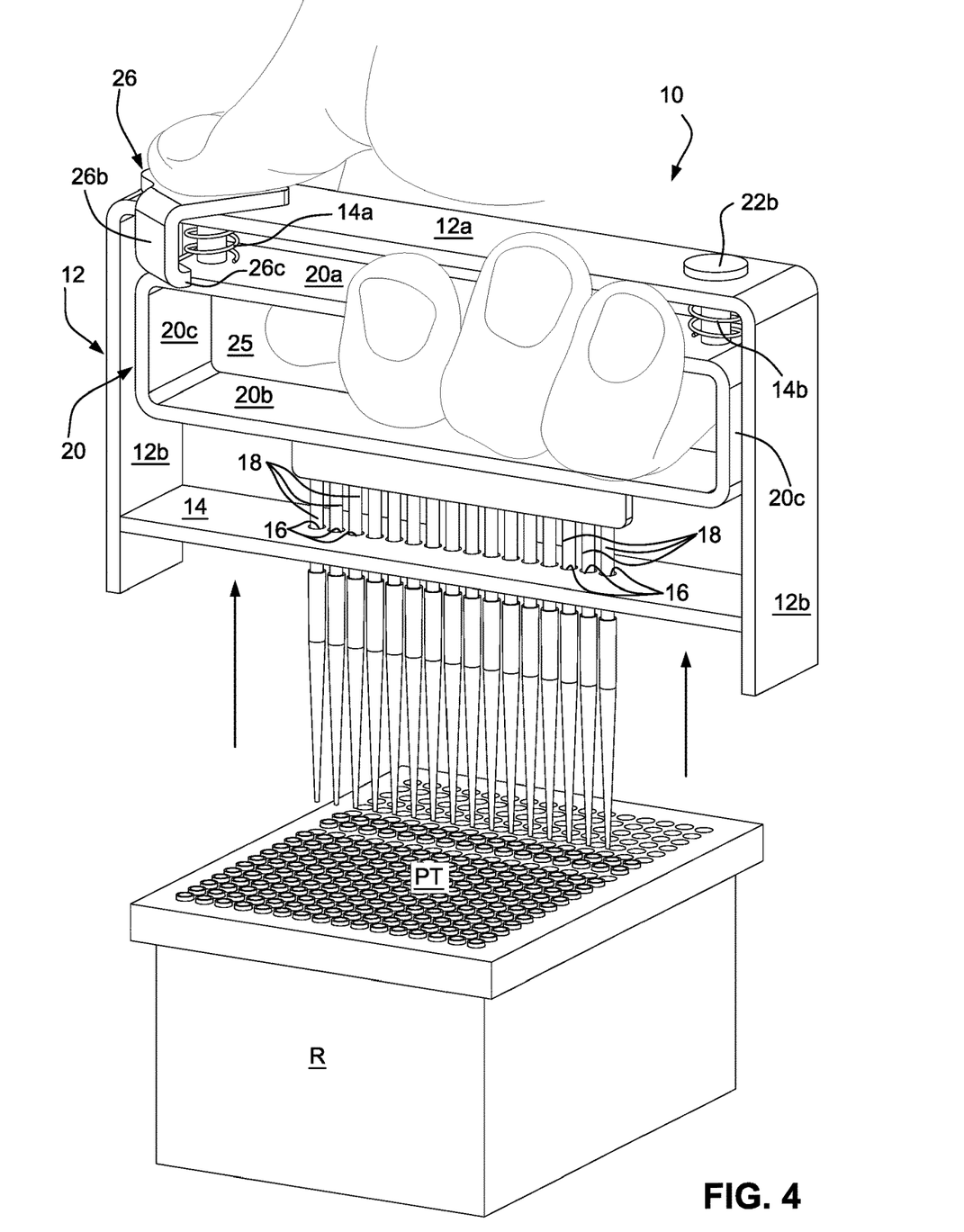
Figure 5:
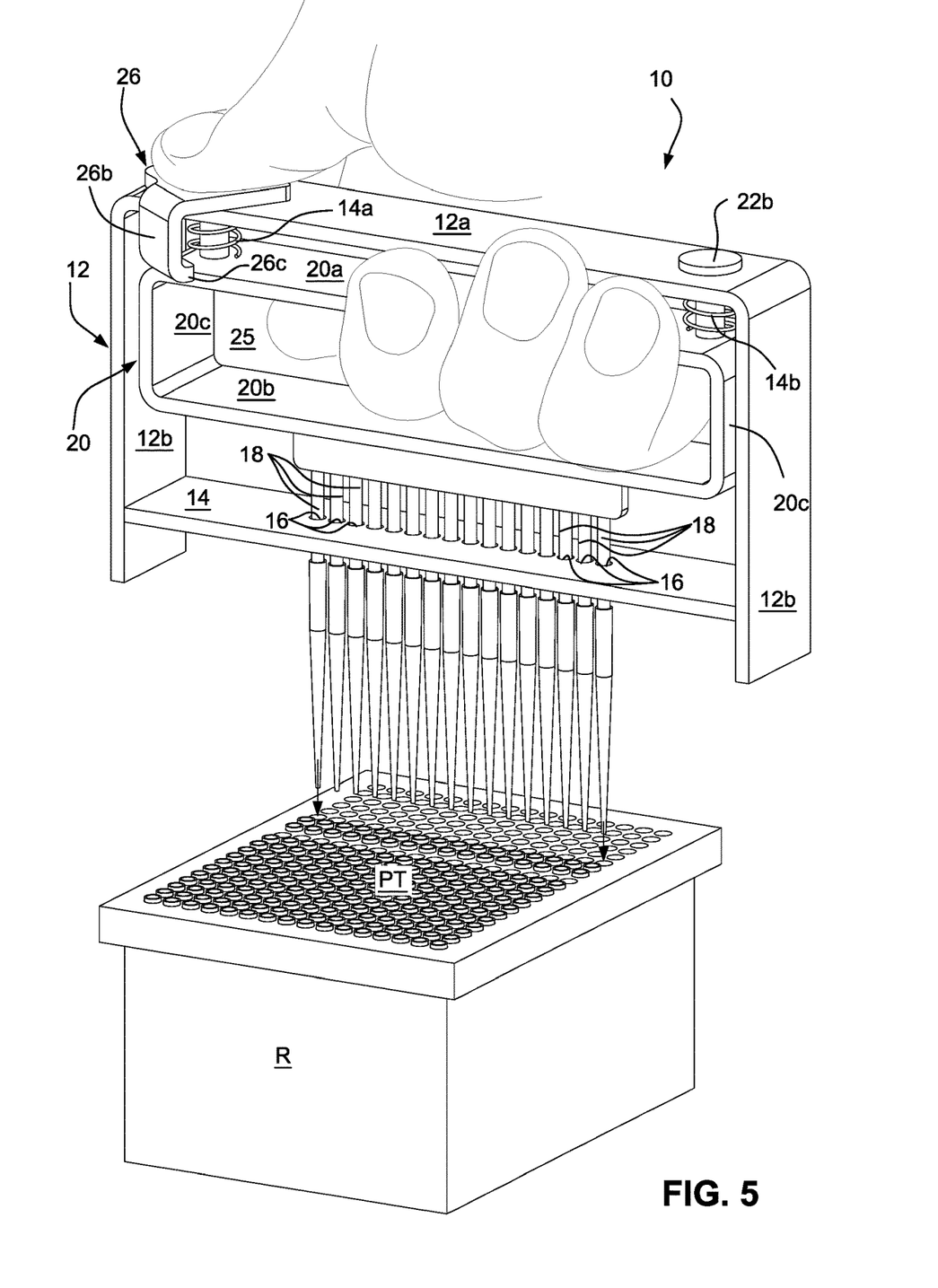

The device may subsequently raised as shown in FIG. 4 so as to remove the pipette tips PT that were initially positioned within the row RN from the rack R to allow repositioning to another location such as some other holder and/or rack associated with laboratory equipment. In FIG. 5, for example, the pipette tips PT frictionally held by the pins 18 are depicted for ease of description as simply being moved to another empty row of holders within the rack RN.

Figure 6:
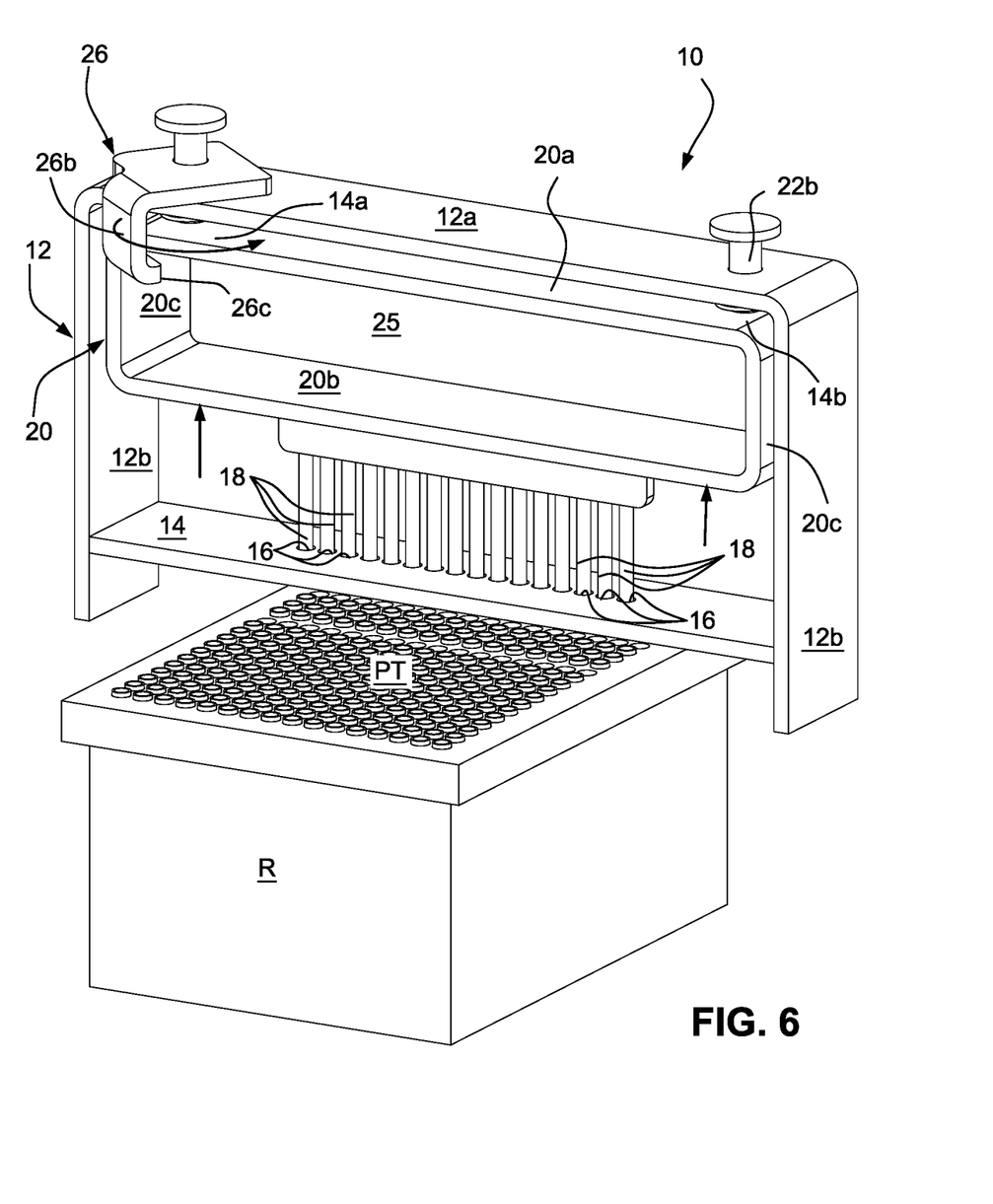
Figure 7:
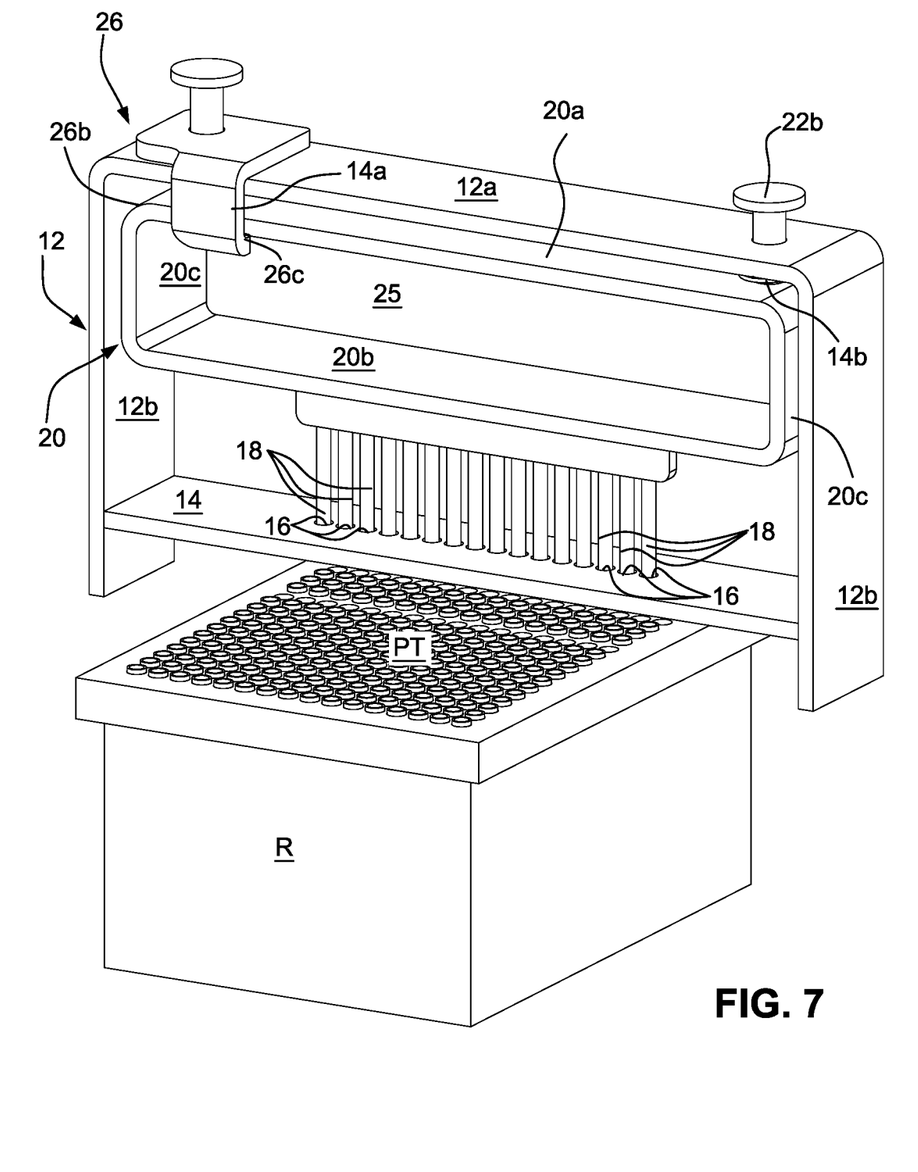

As shown in FIG. 6, when it is desired to release the pipette tips PT from the pins 18, the actuator lock 26 may be pivotally manipulated, e.g., by the user's thumb, to thereby disengage the stop member 26c from the top surface of the upper bracket 20a thereby allowing the actuator bracket to be manually raised against the spring force of the springs 14a, 14b. The upward travel of the actuator bracket 20 is dimensions to that the upper end of each pipette tip PT frictionally held by a respective pin 18 is brought into engagement with the strip bar 14. Thus, a slight further upward movement of the actuator bracket 20 and hence the pins 18 carried thereby is sufficient to frictionally release the pipette tips PT from the pins 18 so they are stripped therefrom and then fall by gravity into their new holder. The actuator bracket 20 may be locked in the uppermost raised position by pivotal and/or lateral manipulation of the actuator lock 26 (e.g., by providing a non-round slightly elongate (oval) opening in the base plate 26a through which the pin 22a extends) so that the stop member 26c is positioned below the upper bracket 20a as shown in FIG. 7. When released from such locked condition, therefore, the actuator bracket 20 will return to its lowered pick-up position under the influence of the force provided by the springs 14a, 14b whereby it may then be locked in such lowered position by manipulation of the actuator lock 26 as described previously such that the stop member 26c is engaged with the top surface of the bracket bar 20a.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A pipette tip transfer device comprising:
a frame;
a strip plate positioned at a lower end of the frame having a linear array of apertures;
an actuator bracket positioned within and mounted to the frame for reciprocal movements between lowered and raised positions;
a linear array of pick-up pins dependently extending from the actuator bracket such that respective pins are moveably received within respective apertures of the plurality of apertures of the strip plate; and
an actuator lock mounted to the frame for manual manipulations between a locked position wherein the actuator lock is engaged with the actuator bracket to lock the actuator bracket in the lowered position, and a released position wherein the actuator lock is disengaged with the actuator bracket to allow the actuator bracket to move between the lowered and raised positions, wherein movement of the actuator bracket from the lowered position to the raised position allows upper ends of pipette tips frictionally captured by terminal ends of the pick-up pins to engage the strip plate and thereby be released from the pins.

2. The device according to claim 1, wherein the frame has an inverted U-shaped configuration having a top handle member and an opposed pair of parallel side members dependently extending from the top handle member.

3. The device according to claim 2, wherein the strip plate is rigidly connected between the opposed pair of parallel side members.

4. The device according to claim 1, wherein the actuator bracket defines an opening sufficient to allow fingers of a user to be inserted therein.

5. The device according to claim 4, wherein the actuator bracket includes upper and lower bracket bars and opposed side bars that are interconnected to one another to define the opening.

6. The device according to claim 1, comprising mounting pins that attach the actuator bracket to the frame to allow for reciprocal rectilinear movements between the lowered and raised positions.

7. The device according to claim 6, further comprising a respective compression spring on each of the mounting pins to apply a spring force against the actuator bracket in a direction moving the actuator bracket into the lowered position.

8. The device according to claim 7, wherein the actuator lock is pivotally connected to one of the mounting pins to allow movement between the locked and released positions.

9. The device according to claim 8, wherein the actuator lock comprises a base plate pivotally attached to the one mounting pin, a spacer plate dependently extending from the base plate, and an inwardly turned stop member, the stop member being engaged with the actuator bracket when the actuator lock is in the locked position, and being disengaged from the actuator bracket when the actuator lock is in the released position.

10. The device according to claim 9, wherein the actuator bracket includes upper and lower bracket bars and opposed side bars that are interconnected to one another to define an opening of sufficient dimension to allow insertion of a user's fingers, wherein the stop member is engaged with a top surface of the upper bracket bar when the actuator lock is in the locked position so as to prevent upward movement of the actuator bracket within the frame member.

* * * * *